UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

HALOGENATED 2.3-NAPHTHISATINS.

1,083,518.  Specification of Letters Patent.  Patented Jan. 6, 1914.

No Drawing.   Application filed June 30, 1913.  Serial No. 776,589.

*To all whom it may concern:*

Be it known that we, WILHELM BAUER, of Vohwinkel, and ALFRED HERRE and RUDOLF MAYER, of Elberfeld, Germany, doctors of philosophy, chemists, citizens of the German Empire, have invented new and useful Improvements in Halogenated 2.3-Naphthisatins, of which the following is a specification.

The present invention relates to the production of new and valuable halogenated 2.3-naphthisatins of the general formula:

(R being a naphthalene ring containing at least one halogenatom in 1 position and the NH of the isatin ring in 2 position, the CO of the isatin ring in 3 position) which can be used for the production of valuable vat dyestuffs. They are red crystalline powders crystallizing from organic solvents in red crystals and which can be converted by treatment with PCl$_5$ into an alpha-chlorid.

The new halogenated naphthisatins are produced by treating alpha-alpha-dihalogen-beta-hydrocyanocarbodinaphthylimid with anhydrous aluminium chlorid and by saponifying the resulting intermediate products.

In order to illustrate the new process more fully the following examples are given, the parts being by weight:—

Example A: 390 parts of alpha-alpha-dichloro-beta-hydrocyanocarbodinaphthylimid (M. P. 201° C.) having most probably the formula:

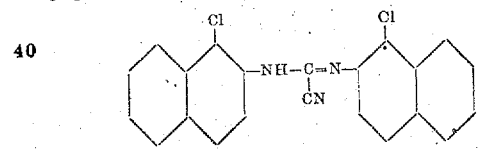

which is obtained by treating with chlorin in a suitable medium the beta-hydrocyanocarbodinaphthylimid (see German Letters Patent 152019) are mixed with 1200 parts of benzene. 350–400 parts of anhydrous aluminium chlorid are then added to this mixture while it is being well stirred and the mixture is heated to 30–35° C. It turns bluish-black. After several hours stirring it is poured into ice water and the benzene is removed by distillation with steam. The intermediate compound thus obtained being most probably the alpha-1-chloronaphthalid of the 1-chloro-2.3-naphthisatin:

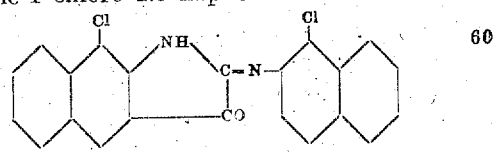

crystallizes from nitrobenzene in brown needles melting at 280° C., soluble in organic solvents with a red-violet, in concentrated sulfuric acid with a reddish-brown color. By boiling with dilute acids it is converted into the 1-chloro-2.3-naphthisatin:

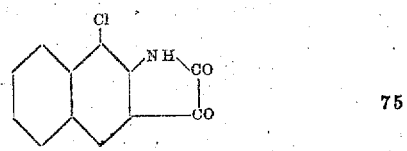

which can be purified by solution in bisulfites and reprecipitation from the bisulfite solution. It forms a brick-red crystalline powder, crystallizing from organic solvents in red needles melting at 258–259° C. By treatment with PCl$_5$ it is converted into an alpha-chlorid which can be combined with suitable components to indigoid coloring matters.

Example B: 1-bromo-2-naphthylamin is converted into the 1.1-dibromo-2.2-dinaphthylthiourea according to the method described by Braun (*Ber.* 39 page 4273) by stirring the 1-bromo-2-naphthylamin for several days with the calculated quantities of carbon-disulfid and a 3 per cent. hydrogen peroxid. The thiourea crystallizes in the shape of white leaflets melting at 180° C. It is then converted into the 1.1-dibromo-hydrocyano-carbo-beta-beta-dinaphthylimid by treatment with carbonate of lead and cyanid of potassium (see German Letters Patent 152019). It crystallizes from benzene in the shape of yellow needles melting at 204° C. 480 parts of the dibromohydrocyanocarbodinaphthylimid are mixed with 1500 parts of benzene. 350–400 parts of anhydrous aluminium chlorid are then slowly added to this mixture while it is being well stirred and the mixture is heated to 30–35° C. It turns bluish-black. After several hours stirring it is poured into ice water and then benzene is removed by distillation with steam. The intermediate compound thus obtained is most probably the alpha-1-bromonaphthalid of the 1-bromo-2.3-naphthisatin. It crystallizes from nitrobenzene in dark violet needles having a metallic luster. M. P. 254° C. By dissolving it in 10–20 times its quantity of cold sulfuric acid, pouring it into ice water and heating the mixture to boiling until it has assumed a red coloration the saponification is complete. The 1-bromo-2.3-naphthisatin can be purified by solution in bisulfites and reprecipitation from the bisulfite solution. It crystallizes from nitrobenzene in red needles melting at 256°-C. Halogen or halogenizing agents convert the new isatins into products containing more halogen.

Example C: To a suspension of 231 parts of 1-chloro-2.3-naphthisatin in 125 parts of chlorobenzene 140 parts of $SO_2Cl_2$ are added. The mixture is slowly heated within 5 hours to 70° C. and kept at 70° C. for 3 hours while the mixture is being well stirred. After cooling the product is filtered off, washed and dried. It is a red crystalline powder melting at 258–250° C. By treating the 1-chloro-2.3-naphthisatin in nitrobenzene suspension with one molecule of bromin at 160° C. the bromo-1-chloro-2.3-naphthisatin is obtained melting at 313° C.

We claim:

1. The herein described halogenated 2.3-naphthisatins having most probably the formula:

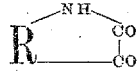

which are red crystalline powders, crystallizing from organic solvents in red crystals and which can be converted by treatment with $PCl_5$ into an alpha chlorid substantially as described.

2. The herein described 1-chloro-2.3-naphthisatin of the formula:

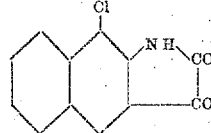

which is a brick-red crystalline powder crystallizing from organic solvents in red needles melting at 258–259° C. and which is converted by treatment with $PCl_5$ into an alpha-chlorid which can be combined with suitable components to indigoid coloring matters.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
HELEN NUFER,
ALBERT NUFER.

---

It is hereby certified that in Letters Patent No. 1,083,518, granted January 6, 1914, upon the application of Wilhelm Bauer, of Vohwinkel, and Alfred Herre and Rudolf Mayer, of Elberfeld, Germany, for an improvement in "Halogenated 2.3-Naphthisatins," an error appears in the printed specification requiring correction as follows: Page 2, line 32, statement of temperature, for "258–250° C." read *258–259° C.;* and that the said Letters Patent should be read with this correction therein that the same may conform to the record of the case in the Patent Office.

Signed and sealed this 24th day of February, A. D., 1914.

[SEAL.]

J. T. NEWTON,

*Acting Commissioner of Patents.* of anhydrous aluminium chlorid are then slowly added to this mixture while it is being well stirred and the mixture is heated to 30–35° C. It turns bluish-black. After several hours stirring it is poured into ice water and then benzene is removed by distillation with steam. The intermediate compound thus obtained is most probably the alpha-1-bromonaphthalid of the 1-bromo-2.3-naphthisatin. It crystallizes from nitrobenzene in dark violet needles having a metallic luster. M. P. 254° C. By dissolving it in 10–20 times its quantity of cold sulfuric acid, pouring it into ice water and heating the mixture to boiling until it has assumed a red coloration the saponification is complete. The 1-bromo-2.3-naphthisatin can be purified by solution in bisulfites and reprecipitation from the bisulfite solution. It crystallizes from nitrobenzene in red needles melting at 256° C. Halogen or halogenizing agents convert the new isatins into products containing more halogen.

Example C: To a suspension of 231 parts of 1-chloro-2.3-naphthisatin in 125 parts of chlorobenzene 140 parts of $SO_2Cl_2$ are added. The mixture is slowly heated within 5 hours to 70° C. and kept at 70° C. for 3 hours while the mixture is being well stirred. After cooling the product is filtered off, washed and dried. It is a red crystalline powder melting at 258–250° C. By treating the 1-chloro-2.3-naphthisatin in nitrobenzene suspension with one molecule of bromin at 160° C. the bromo-1-chloro-2.3-naphthisatin is obtained melting at 313° C.

We claim:

1. The herein described halogenated 2.3-naphthisatins having most probably the formula:

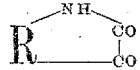

which are red crystalline powders, crystallizing from organic solvents in red crystals and which can be converted by treatment with $PCl_5$ into an alpha chlorid substantially as described.

2. The herein described 1-chloro-2.3-naphthisatin of the formula:

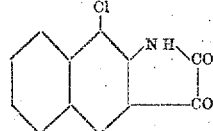

which is a brick-red crystalline powder crystallizing from organic solvents in red needles melting at 258–259° C. and which is converted by treatment with $PCl_5$ into an alpha-chlorid which can be combined with suitable components to indigoid coloring matters.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
HELEN NUFER,
ALBERT NUFER.

---

It is hereby certified that in Letters Patent No. 1,083,518, granted January 6, 1914, upon the application of Wilhelm Bauer, of Vohwinkel, and Alfred Herre and Rudolf Mayer, of Elberfeld, Germany, for an improvement in "Halogenated 2.3-Naphthisatins," an error appears in the printed specification requiring correction as follows: Page 2, line 32, statement of temperature, for "258–250° C." read *258–259° C.;* and that the said Letters Patent should be read with this correction therein that the same may conform to the record of the case in the Patent Office.

Signed and sealed this 24th day of February, A. D., 1914.

[SEAL.]

J. T. NEWTON,
*Acting Commissioner of Patents.*

Correction in Letters Patent No. 1,083,518.

It is hereby certified that in Letters Patent No. 1,083,518, granted January 6, 1914, upon the application of Wilhelm Bauer, of Vohwinkel, and Alfred Herre and Rudolf Mayer, of Elberfeld, Germany, for an improvement in "Halogenated 2.3-Napbthisatins," an error appears in the printed specification requiring correction as follows: Page 2, line 32, statement of temperature, for "258-250° C." read *258-259° C.;* and that the said Letters Patent should be read with this correction therein that the same may conform to the record of the case in the Patent Office.

Signed and sealed this 24th day of February, A. D., 1914.

[SEAL.]
J. T. NEWTON,
*Acting Commissioner of Patents.*